UNITED STATES PATENT OFFICE.

THOMAS ROBINSON, OF CAMBRIDGE, ASSIGNOR TO THE STALACTITE DECORATIVE COMPANY, OF BROOKLINE, MASSACHUSETTS.

METHOD OF DECORATING SURFACES.

SPECIFICATION forming part of Letters Patent No. 396,116, dated January 15, 1889.

Application filed April 11, 1888. Serial No. 270,343. (No specimens.)

*To all whom it may concern:*

Be it known that I, THOMAS ROBINSON, of Cambridge, in the county of Middlesex and State of Massachusetts, have invented certain new and useful Improvements in the Method of Decorating Surfaces, of which the following is a specification.

This invention has for its object to to produce ornamental designs on metal, wood, and other surfaces by the action of hop extract or malt on an acidulated pigment color spread on the surface to be ornamented, the hop extract being dropped on the acidulated pigment and rupturing or breaking the same into minute divisions or ramifications, through which the color of the ground or surface on which the pigment laid is visible, the result being a variegated ornamentation, the effect of which can be variously modified by the quantity of hop extract employed and the manner of applying the same.

In carrying out my invention I spread upon the surface to be ornamented a thin paste composed of any suitable mineral pigment—such as Vandyke brown, ocher, burnt sienna, &c.—and acetic acid diluted with five times its bulk of water, or any other suitable weak acid—such as vinegar—the proportions of pigment and dilute acid being such as to make a paste which can be readily applied with a brush. The color of the pigment should contrast harmoniously with that of the ground or surface on which it is spread. I then take hops and make an infusion thereof with boiling water and dissolve in said infusion a small quantity of gum-arabic. This hop infusion I drop upon the coating of acidulated pigment at such points as may be suitable for the production of the desired effect. The hop infusion immediately acts to break or rupture the acidulated pigment in various directions and create fine veins and fissures therein, through which the color of the ground or surface on which the pigment is spread is visble, the filaments of the pigment appearing on said surface in contrast with the color of the latter, and giving a very striking ornamental effect, which can be varied by varying the quantity and mode of application of the hop infusion and by varying the colors of the ground and of the acidulated pigment. For example, by allowing the hop infusion to fall drop after drop on one spot the divisions of the pigment caused by the action of hop infusion will radiate from the spot on which the drops fall, and will form a set figure which is circular in the center and has radiating branches or filaments, its size being dependent on the quantity of the hop infusion employed.

If the hop infusion be thrown upon the acidulated pigment in fine drops scattered over the surface of the pigment, a mottled effect is produced, each drop making a small independent figure.

Aniline or other colors may be added to the hop infusion to still further variegate the ornamentation. The gum dissolved in the hop infusion acts to fix the pigment and prevent it from crumbling into powder when dry.

I have used ale, lager-beer, and porter with good results as substitutes for the hop infusion, and I believe the described pigment breaking or rupturing effect is due to the hop extract contained in said liquids; but I do not limit myself to any particular form of hop extract.

Sheets of tin or glass decorated by this improved method are especially adapted for the decoration of walls and ceilings. Pieces of wood may also be so decorated for use in furniture, wainscoting, &c. Marble and other stone surfaces may also be decorated by this method.

I claim—

1. The improved method of decorating metal, wood, and other surfaces herein described, the same consisting in spreading an acidulated pigment upon the surface to be decorated, and then applying a liquid hop extract to said pigment, as set forth.

2. The improved method of decorating surfaces, the same consisting in spreading an acidulated pigment upon the surface to be decorated, and then applying to said pigment a liquid hop extract containing a dissolved gum, as set forth.

In testimony whereof I have signed my name to this specification, in the presence of two subscribing witnesses, this 28th day of March, A. D. 1888.

THOMAS ROBINSON.

Witnesses:
  C. F. BROWN,
  A. D. HARRISON.